United States Patent
Bishop, Jr. et al.

(10) Patent No.: US 9,693,206 B2
(45) Date of Patent: Jun. 27, 2017

(54) SYSTEM FOR PROVIDING HIGH-EFFICIENCY PUSH-TO-TALK COMMUNICATION SERVICE TO LARGE GROUPS OVER LARGE AREAS

(71) Applicant: Exelis Inc., McLean, VA (US)

(72) Inventors: James William Bishop, Jr., Colorado Springs, CO (US); Thomas Russell Topping, Phoenix, AZ (US)

(73) Assignee: Harris Corporation, Melbourne, FL (US)

(*) Notice: Subject to any disclaimer, the term of this patent is extended or adjusted under 35 U.S.C. 154(b) by 504 days.

(21) Appl. No.: 13/901,893

(22) Filed: May 24, 2013

(65) Prior Publication Data

US 2014/0349626 A1    Nov. 27, 2014

Related U.S. Application Data

(60) Provisional application No. 61/760,325, filed on Feb. 4, 2013.

(51) Int. Cl.
| | | |
|---|---|---|
| *H04W 4/10* | (2009.01) | |
| *G10L 13/00* | (2006.01) | |
| *H04W 4/12* | (2009.01) | |

(52) U.S. Cl.
CPC .............. *H04W 4/10* (2013.01); *G10L 13/00* (2013.01); *H04W 4/12* (2013.01)

(58) Field of Classification Search
CPC ........................................................ H04B 7/00
See application file for complete search history.

(56) References Cited

U.S. PATENT DOCUMENTS

| | | |
|---|---|---|
| 5,603,079 A | 2/1997 | Olds |
| 5,613,194 A | 3/1997 | Olds |
| 5,721,534 A | 2/1998 | Olds |
| 5,905,443 A | 5/1999 | Olds |

(Continued)

OTHER PUBLICATIONS http://www.defenseindustrydaily.com/217M-for-Phase-II-of-Netted-Iridium-Program-05483/, [downloaded—Mar. 6, 2015], p. 1.

(Continued)

*Primary Examiner* — Vladimir Magliore
*Assistant Examiner* — Frank Donado
(74) *Attorney, Agent, or Firm* — Dan Fiul; Tarolli, Sundheim, Covell & Tummino LLP (57) ABSTRACT

A system, various methods, and a specific apparatus are provided for the purpose of supporting push-to-talk (PTT) service for a very large group featuring a significantly higher number of listeners than the number of potential talkers, as well as a constrained vocabulary in normal usage. The invention takes advantage of speech-to-text and text-to-speech conversion in end user devices for maximum utterance compression. The invention uses the Iridium Mobile Satellite Service (MSS) system and its Short Burst Data (SBD) service for unicast transmission of talker utterances to a PTT Server, and the same system's Global Data Broadcast (GDB) service for multicast retransmission of utterances from the PTT Server to an effectively unlimited number of listeners. The PTT Server provides priority ordering and preemption as necessary when multiple talkers provide near-simultaneous utterances, effectively managing the floor without interactive protocols among the talkers.

45 Claims, 5 Drawing Sheets

(56) References Cited

U.S. PATENT DOCUMENTS

| | | | |
|---|---|---|---|
| 6,577,848 B1 | 6/2003 | Gregg et al. | |
| 8,880,019 B1* | 11/2014 | Daly | H04H 20/59 455/404.1 |
| 2004/0082340 A1* | 4/2004 | Eisinger | H04L 29/06 455/456.1 |
| 2006/0046715 A1* | 3/2006 | Burgemeister | H04B 7/18506 455/431 |
| 2006/0229090 A1* | 10/2006 | LaDue | H04L 27/0004 455/507 |
| 2006/0234691 A1* | 10/2006 | Dygert | 455/418 |
| 2007/0082686 A1* | 4/2007 | Mumick | H04L 12/5895 455/466 |
| 2007/0155415 A1* | 7/2007 | Sheehy et al. | 455/518 |
| 2008/0299980 A1* | 12/2008 | Buckley | H04W 28/06 455/445 |
| 2009/0004996 A1* | 1/2009 | Peleg | H04L 65/605 455/403 |
| 2010/0216509 A1* | 8/2010 | Riemer | H04M 1/72577 455/557 |
| 2010/0267411 A1* | 10/2010 | Allen | H04B 1/3833 455/518 |
| 2013/0072178 A1* | 3/2013 | Shaw | H04M 3/53333 455/418 |
| 2013/0151599 A1* | 6/2013 | Santoro | G06F 3/0481 709/203 |
| 2013/0204998 A1* | 8/2013 | Russell et al. | 709/223 |
| 2014/0113544 A1 | 4/2014 | Topping et al. | |
| 2014/0141818 A1* | 5/2014 | Yoakum | H04L 51/26 455/466 |

OTHER PUBLICATIONS

The Global Network: Satellite Constellation, Jul. 2012 pp. 1-2. http://investor.iridium.com/releasedetail.cfm?ReleaseID=556479, [downloaded—Mar. 6, 2015], pp. 1-2.
Iridium SBD Short Burst Data Service, Oct. 2013, pp. 1-4. http://www.iridium.com/support/products/IridiumSBD.aspx, [downloaded—Mar. 6, 2015], p. 1.

* cited by examiner

120 PTT USER TERMINAL

500 TERMINAL PLATFORM HARDWARE
- TACTILE/VISUAL COMPONENTS 503
- AUDIO INPUT/OUTPUT COMPONENTS 502
- IRIDIUM RADIO ACCESS MODULE 501

510 PROGRAMMABLE APPLICATION PROCESSOR
- PROCESSING RESOURCES 513
- INFORMATION STORAGE 512
- PERIPHERAL I/O INTERFACES 511

520 APPLICATION MODULES

TALKER FUNCTIONS 550
- SPEECH INPUT DRIVER 551
- RECOGNITION ENGINE 552
- SBD OUTPUT HANDLER 553

LISTENER FUNCTIONS 570
- GDB INPUT HANDLER 571
- SYNTHESIS ENGINE 572
- AUDIO OUTPUT DRIVER 573

MANAGEMENT FUNCTIONS 560
- AUTHENTICATION AGENT 561
- REGISTRATION AGENT 562
- PROVISIONING AGENT 563

KNOWLEDGE FUNCTIONS 530
- USER IDENTITY MODULE 531
- GROUP MEMBERSHIP INFO 532
- CONTACT DIRECTORY 533
- RECOGNITION DICTIONARY 534
- SYNTHESIS DICTIONARY 535

SYSTEM FOR PROVIDING HIGH-EFFICIENCY PUSH-TO-TALK COMMUNICATION SERVICE TO LARGE GROUPS OVER LARGE AREAS

The present application claims priority from U.S. Provisional No. 61/760,325, entitled "SYSTEM FOR PROVIDING HIGH-EFFICIENCY PUSH-TO-TALK COMMUNICATION SERVICE TO LARGE GROUPS OVER LARGE AREAS", to Bishop et al., filed Feb. 4, 2013, the entirety of which is explicitly incorporated herein by reference.

BACKGROUND OF THE INVENTION

Push-to-talk (PTT) wireless voice communication has a long history, stretching back to the "handy-talky" military radio of World War II and encompassing various forms of "walkie-talkie" military, police/fire, commercial, hobbyist, and even toy radios. Many such systems have relied on peer to peer radio communication, in which each user transmits directly to all other users via a shared radio spectrum. This technique limits range to that of the individual unit and its transmit power. Other systems, particularly including the dedicated trunked-radio systems deployed for commercial users and first responders, employ repeaters with greater transmit power and receive sensitivity than a handheld unit can achieve, thereby multiplying the reach of a network significantly.

Most recently, PTT systems have been built on top of cellular radio network technologies, allowing the specialized group-communication needs of typical PTT users to take advantage of the commercially successful and widely deployed cellular networks. These systems expand upon the repeater topology model of trunked radio, relying on multiple interconnected base stations to extend the reach of the power-limited handsets, rather than the very large repeater stations typical of trunked radio installations. A development of particular note in this area is the application of Mobile Satellite Services (MSS) systems to PTT group communication, embodied in the Distributed Tactical Communication System (DTCS) developed by the US Navy for Marines deployed around the world. As described in http://www.defenseindustrydaily.com/217M-for-Phase-II-of-Netted-Iridium-Program-05483/, this system builds upon the Iridium MSS system to provide voice group communication for up to 2,000 users in an area up to 250 miles wide. Per http://www.iridium.com/DownloadAttachment.aspx?attachmentID=1197, each spot beam of an Iridium satellite is about 250 miles in diameter, suggesting that DTCS service is provided only within the coverage area of a single beam. In addition to the existing capability, according to http://investor.iridium.com/releasedetail.cfm?ReleaseID=556479, enhanced capabilities under development at the time of this writing promise to expand the DTCS user capacity by a factor of 30. Though not stated explicitly in the public information, this would seem to imply an increase in the number of group members to some tens of thousands (2,000×30=60,000), and may also imply an increase in the range of coverage to incorporate multiple beams in the serving area for a particular group. It is possible that techniques taught in U.S. Pat. No. 6,577,848 may be incorporated in both current and future DTCS designs. In any case, a PTT system built on the Iridium MSS system is of special interest due to its global coverage and ability to provide service in areas that do not have trunked radio or cellular coverage.

In all this prior art, the primary goals of each PTT system have been to adjudicate which user is allowed to speak, and to relay that user's speech burst to all the other users. The older systems relied upon the people themselves to resolve channel utilization conflicts using social protocols, also known as "floor control," and used direct frequency modulation techniques to convey the analog audio over the radio. Current systems employ digital packet protocols to negotiate floor control, digital speech coding with compression to represent the talker's speech burst (also known as an "utterance"), and digital radio modulation techniques to carry both. Even the latest systems with digital speech coding and the deepest available compression techniques require at least 2,400 bits to convey each second of the talker's utterance over the network, and current designs attempt to match the channel resource to that bit rate so as to convey each utterance in real time. An average utterance lasting 5 seconds thus transmits at least 1,500 bytes over 5 seconds of channel time, plus whatever overhead is required for channel management and floor control in the specific system. Regarding floor control as well, the protocols are generally designed based on the assumption that any group member may attempt to speak at any time; this assumption tends to limit the scale of groups. Outside the domain of PTT service, techniques exist in the prior art that allow users to dictate a message into the Short Message Service (SMS) capability ubiquitous in current cellular handsets, as well as to read back a message received via SMS. This technology is normally used to avoid the use of hands for messaging while driving; it is not normally used to carry on a real-time conversation, for which an ordinary phone call is well suited, and more efficient. However, this speech-to-text and text-to-speech technology is available for application in the PTT domain, and offers the opportunity for extreme compression. For example, the 5-second, 1500-byte utterance mentioned above may require only 150 bytes to convey if transcribed as text.

Another attribute of prior art systems, and particularly the cellular-based digitally-coded systems in common use today, is their use of a power-optimized traffic channel to convey the coded speech of each utterance. These radio channels are typically run at a power level that assumes not quite perfect channel conditions, but that still requires each user in the group to be holding his or her handset in the talking/listening position wherein the antenna is deployed appropriately. In Iridium, for example, it is well known that the traffic channel power level is so low that during a call the handset must either be attached to a separate antenna mounted in an optimal location, or held to the ear with the embedded antenna extended and angled properly above the head. This likely applies in DTCS as well, although no public information is available to confirm it.

The system attributes described in the two foregoing paragraphs support the observation that some conceivable applications of PTT service are not effectively satisfied by existing prior art systems due to scalability constraints linked to the specific efficiency and capacity considerations associated with the usage assumptions cited. In particular, situations in which most users are only listeners and who either do not need to or cannot keep a handset in optimal position are excluded from the groups supportable in the prior art. What is needed, then, is a system that supports such groups, which may number 10,000 to 1,000,000 or more members listening as a background activity but which feature only a handful of potential speakers.

It is thus a principal aim of the present invention to provide a system that supports PTT services for such large and asymmetric groups, optimizing resource utilization differently from the prior art using novel techniques and construction not found in the prior art.

SUMMARY OF THE INVENTION

In accordance with the principles of the present invention, a method of providing a communication to a receiving device comprises conversion of a first audio utterance into a text based message; and transmission, via a text delivery optimized communication network, of the text based message. The text based message is transmitted, via a broadcast optimized communication network, to at least one receiving device to convert the text based message into a second audio utterance.

In further accordance with the principles of the present invention, a communication device to communicate with a receiving device comprises a speech-to-text converter to convert a first audio utterance into a text based message; and a transmitter to transmit, via a text delivery optimized communication network, the text based message. The text based message is transmitted, via a broadcast optimized communication network, to at least one receiving device to convert the text based message into a second audio utterance.

In further accordance with the principles of the present invention, a method of providing a communication to a receiving device comprises reception, via a broadcast optimized communication network, of a text based message; and conversion of the text based message into a second audio utterance. The text based message is transmitted, via a text delivery optimized communication network, from a transmitting device that converts a first audio utterance into the text based message.

In further accordance with the principles of the present invention, a communication device comprises a receiver to receive, via a broadcast optimized communication network, a text based message; and a text-to-speech converter to convert the text based message into a second audio utterance. The text based message is transmitted, via a text delivery optimized communication network, from a transmitting device converting a first audio utterance into the text based message.

In further accordance with the principles of the present invention, a communication server comprises an input handler to receive, via a text delivery optimized communication network, a text based message; and a subroutine, at the communication server, to identify a destination parameter associated with the text based message. An output handler at the communication server transmits, via a broadcast optimized communication network, the text based message to at least one receiving device based on the destination parameter. The at least one receiving device converts the text based message into an audio utterance.

BRIEF DESCRIPTION OF THE DRAWINGS

Features and advantages of the present invention will become apparent to those skilled in the art from the following description with reference to the drawings. The invention will be better understood from a reading of the following detailed description in conjunction with the drawing figures, in which like reference designators are used to identify like elements and in which.

DETAILED DESCRIPTION OF THE PREFERRED EMBODIMENTS

This invention pertains in general to closed-group push-to-talk communication among associated wireless handset device users. The invention pertains in particular to providing such communication to large groups numbering in the hundreds, thousands, or millions of users, who are distributed widely over an area potentially as large as the entire world. The invention further pertains in particular to using a highly efficient communication means to provide such service.

The present invention provides an asymmetric half-duplex communication construct that uses the Iridium MSS system for a highly efficient PTT service supporting a relatively small number of potential talkers, and a very large number of potential listeners whose various radio equipments are not necessarily in optimal positions for low-power radio reception.

For the highest possible efficiency of speech burst transmission, observe that in the groups with the target asymmetry of talkers and listeners, it is usual for communication to be constrained using a specialized and limited vocabulary such as those found in military, search and rescue, civil defense, firefighting, or law enforcement settings. With the amount of processing capability available in handheld and other portable devices using current technology, the use of a constrained vocabulary allows very reliable speech recognition even without specific-speaker training. Thus the present invention incorporates speech-to-text and text-to-speech capabilities at the user devices for maximum compression of utterances.

For the transport of converted utterances from a talker into the network, the present invention uses the Iridium Short Burst Data (SBD) service, on which more information is available via http://www.iridium.com/DownloadAttachment.aspx?attachmentID=890. This capability is designed to carry messages up to 340 bytes in the most efficient manner available on the Iridium network. Using SBD, the permitted talkers in a PTT group don't need any floor control protocol amongst them. Instead, they use the SBD service's native system access protocol to queue their respective messages into the network. A PTT host server receives these talk burst messages and sends them in turn to the listeners via a heretofore undisclosed Iridium broadcast capability.

For the transport of converted utterances from the network back to the multitude of listeners, the present invention uses the Iridium Global Data Broadcast (GDB) service. This capability is design to transmit messages up to several thousand bytes to an unlimited number of receivers within a target delivery area. Each message is addressed to a unique group, and any number of devices may be configured to receive messages to that address. GDB is built upon the Iridium Paging channel described in U.S. Pat. No. 5,603,079, but it uses a timing hierarchy that supports low-latency delivery, and a message format that enables group-directed broadcasting capability, instead of the long cycle and individual addressing techniques designed to support individual low-power pagers that are described there and in related U.S. Pat. Nos. 5,613,194, 5,721,534, and 5,905,443.

A significant advantage of GDB over the techniques used in U.S. Pat. No. 6,577,848, and presumably Iridium DTCS, is that the transmit power level from the satellite is significantly higher in GDB than that of the traffic channel used in the PTT prior art. This attribute is inherited from the Paging channel of U.S. Pat. No. 5,603,079 as implemented in the Iridium MSS system. Listen-only group members are therefore able to receive the converted PTT utterances via this high-power channel with a less capable, that is smaller or not optimally deployed, antenna. This attribute of the present invention enables very large PTT groups, with the potential number of listeners practically unlimited. Additional information regarding GDB is available in U.S. patent application Ser. No. 13/657,295, the entirety of which is expressly incorporated herein by reference.

Figure 1:
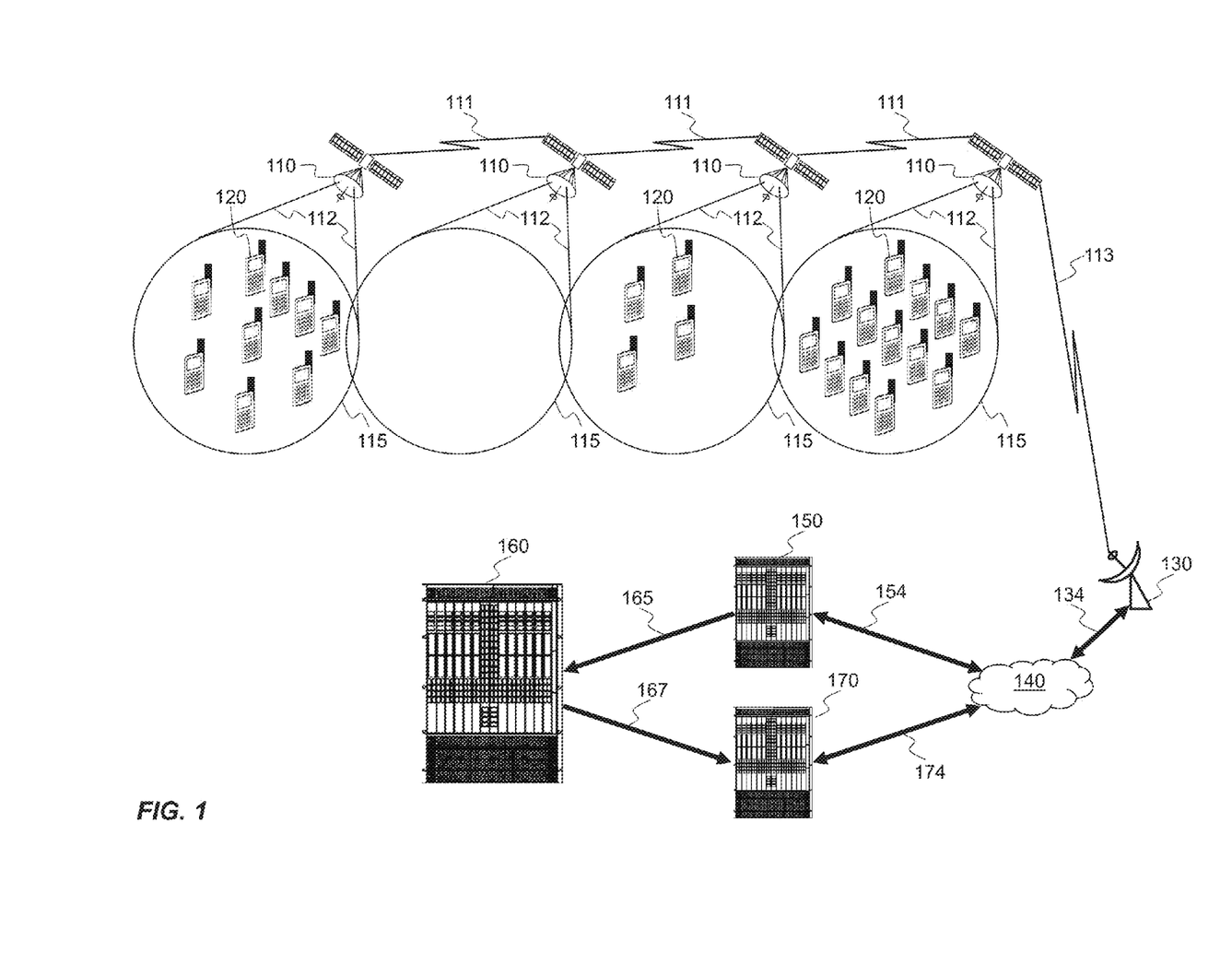
FIG. 1 illustrates a high-level block diagram of the overall system in which the present invention operates, in accordance with the principles of the present invention.

In FIG. 1, each of multiple Satellites 110 offers wireless connectivity for push-to-talk and other services to zero or more PTT User Terminals 120 that lie within each respective Coverage Area 115. Each Coverage Area 115 is formed by its respective Satellite 110 via transmission and reception of radio frequency energy using its respective Antenna Projections 112. Satellites 110 communicate with one another via one or more wireless Crosslinks 111, and with each of one or more Satellite Earth Stations 130 via a corresponding wireless Feederlink 113. Detail regarding these fundamental elements of the Iridium Mobile Satellite Services System is readily available to those skilled in the art, and constitute a basis on which the present invention is built.

Satellite Earth Stations 130 in turn provide access to the constellation of Satellites 110 on behalf of ground-based network elements, attaching via Network Interface 134 to Ground Network 140 for the transport of data among them. Ground Network 140 is preferably based on the well-known Internet Protocol and related technologies.

Ground-based network elements pertinent to the present invention include the SBD Gateway 150 and the GDB Gateway 170, which connect to Ground Network 140 via Network Interfaces 154 and 174 respectively. These elements are not new for this invention, and so are not detailed further. Information regarding SBD and its architecture can be found at http://www.iridium.com/support/products/IridiumSBD.aspx. Information regarding GDB and its architecture can be found in U.S. patent application Ser. No. 13/657,295.

PTT Server 160 is the ground-based actor in the present invention. This network element receives SBD messages via SBD Application Interface 165, and sends GDB messages via GDB Application Interface 167. PTT Server 160 is described in detail later under FIG. 3.

Figure 2:
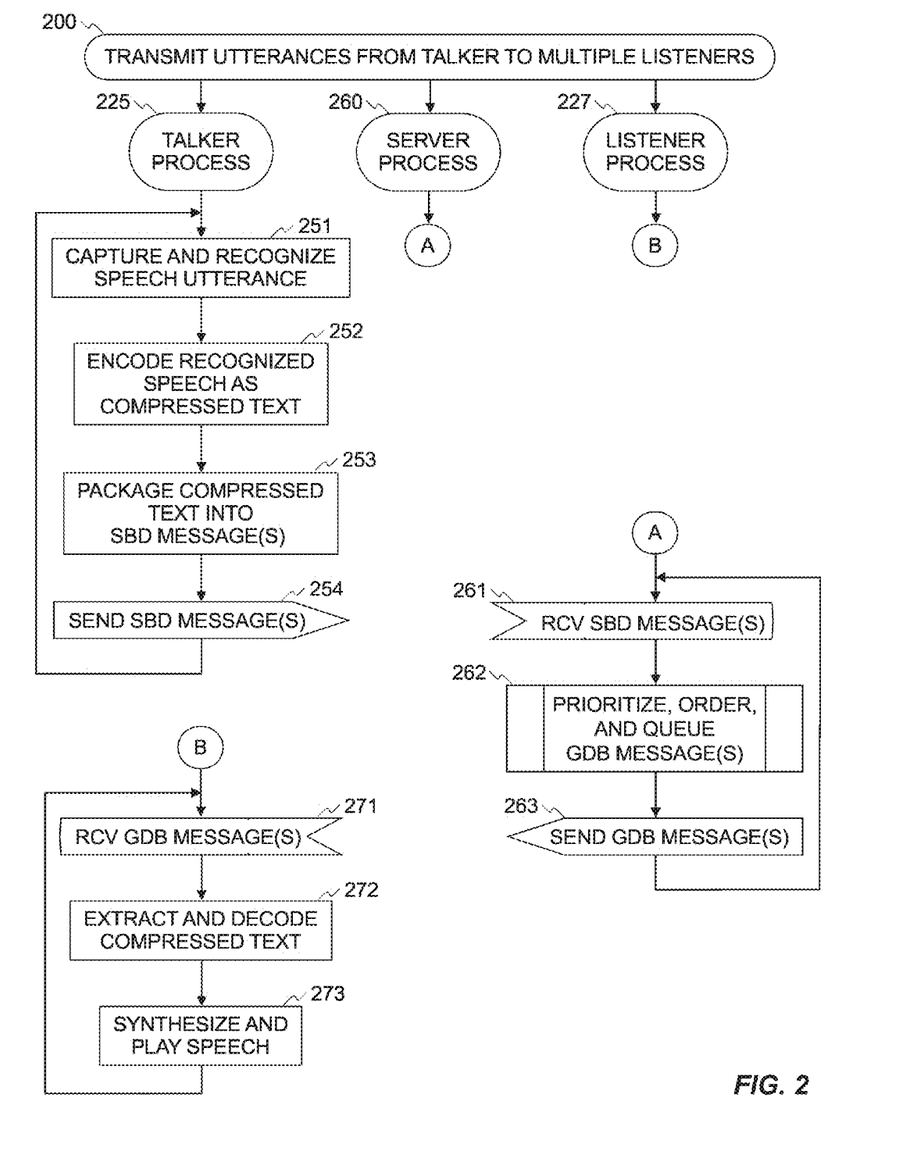
FIG. 2 illustrates a flow chart for the process of transmitting an utterance from a talker to an unlimited number of listeners in accordance with the present invention, in accordance with the principles of the present invention.

FIG. 2 details the fundamental method of the present invention, whereby a talker with a PTT User Terminal 120 speaks and the utterance is conveyed to any number of listeners with their own PTT User Terminals 120. Method 200, Transmit Utterances from Talker to Multiple Listeners, consists of three independent but communicating processes, shown in the diagram as Talker Process 225, Server Process 260, and Listener Process 227.

Talker Process 225 operates in PTT User Terminal 120 as a continuous loop once activated. At Step 251, the talker's utterance is captured from the analog audio domain using digital techniques well known to those skilled in the art, and then processing by a speech recognition algorithm to determine the actual sequence of words that was spoken. Numerous speech recognition technologies exist in the art, and any may be incorporated into this method according to the needs of a particular deployment environment or application. In a preferred embodiment, a productized speech recognition engine available on the open market will be incorporated in the method for best results. Once the talker's words have been determined, Step 252 encodes the recognized speech as text and then compresses it for optimal utilization of transmission resources. Step 253 in turn packages the compressed text into one or more messages for transmission, in a preferred embodiment, using the Iridium SBD service. These messages are sent in Step 254 using the capabilities provided in the Iridium system, at which point the process returns to the beginning to stand ready for another utterance.

Server Process 260, operating in a continuous loop in PTT Server 160, receives at Step 261 the one or more SBD Messages sent by the talker's PTT User Terminal 120 at Step 254, via SBD Gateway 150. These messages are then handled by Subroutine 262, Prioritize, Order, and Queue GDB Message(s), which is described in detail under FIG. 4. Subroutine 262 returns a list of GDB Messages and corresponding destination parameters, which are in turn sent via GDB Gateway 170 in Step 263, whereupon the process returns to the beginning to stand ready for more SBD Messages.

In its turn Listener Process 227, operating as a continuous loop when activated in one to many PTT User Terminals 120, will at Step 271 receive the GDB Messages addressed to it by Step 263. Each received message will be processed at Step 272 to extract and decode the compressed text carried within it. Then at Step 273 that text will be put through a speech synthesis algorithm to generate corresponding analog audio and play it to the listener, whereupon the process will return to the beginning to stand ready for more GDB Messages. As with the speech recognition algorithm, numerous speech synthesis technologies exist in the art, and for the purposes of the present invention any suitable product may be incorporated in an implementation embodying Method 200.

Figure 3:
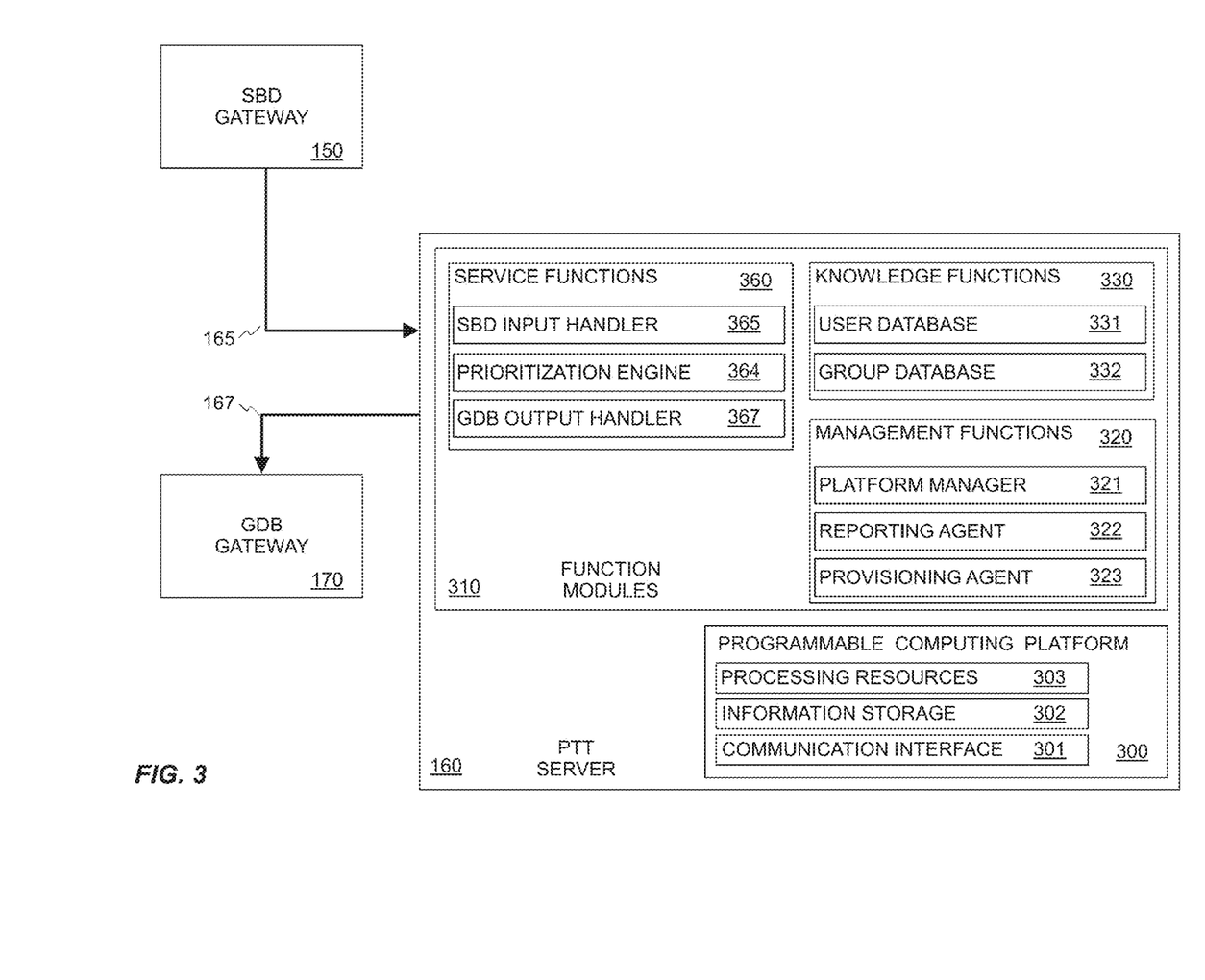
FIG. 3 illustrates a block diagram of a PTT Server responsible for receiving utterances from talkers via SBD and transmitting utterances to listeners via GDB, in accordance with a preferred embodiment of the present invention, in accordance with the principles of the present invention.

FIG. 3 depicts the detailed architecture of PTT Server 160, accompanied by the SBD Gateway 150 and GDB Gateway 170 with which it interacts directly via their respective Application Interfaces 165 and 167. In a preferred embodiment, PTT Server 160 is implemented as a set of Function Modules 310 that operate as software processes executing on a Programmable Computing Platform 300. Programmable Computing Platform 300 may be any commonly available product that provides the necessary components, which are well known by those skilled in the art and comprise Processing Resources 303, Information Storage capacity 302, and Communication Interfaces 301.

The infrastructure aspect of the present invention is primarily embodied as the specific Function Modules 310 that are implemented within PTT Server 160, Management Functions 320, Knowledge Functions 330, and Service Functions 360.

Within Management Functions 320 reside typical components that are commonly used in network elements like this one. Platform Manager 321 provides the operating system that connects the software to the hardware, as well as the common management capabilities that are used for enabling and disabling components and functions. Reporting Agent 322 provides the capability to report faults and other events, as well as performance statistics and service records, to an operator or network management entity. Provisioning Agent 323 provides the capability to configure PTT Server 160 for its network environment, as well as to record in the components of Knowledge Functions 330 the identities and other characteristics of the users and groups that are permitted to use the services implemented in the components of Service Functions 360.

Knowledge Functions 330 provide storage and retrieval capabilities for the data required to provide PTT service. User Database 331 holds information about each system user, and Group Database 332 holds information about each established group including which users are its members.

Service Functions 360 comprise three components that embody the steps of Server Process 260. An SBD Input Handler 365 takes in the messages containing recognized speech encoded as compressed text that have been sent by a talker's PTT User Terminal 120 via the SBD service through SBD Gateway 150 and SBD Application Interface 165. Each such message is handed off to Prioritization Engine 364, which executes the method of FIG. 4 to order and queue each message for transmission via GDB to the appropriate region or regions where corresponding listeners and their PTT User Terminals 120 are located. GDB Output Handler 367 implements the details of sending these messages out via GDB Application Interface 167 and GDB Gateway 170.

Figure 4:
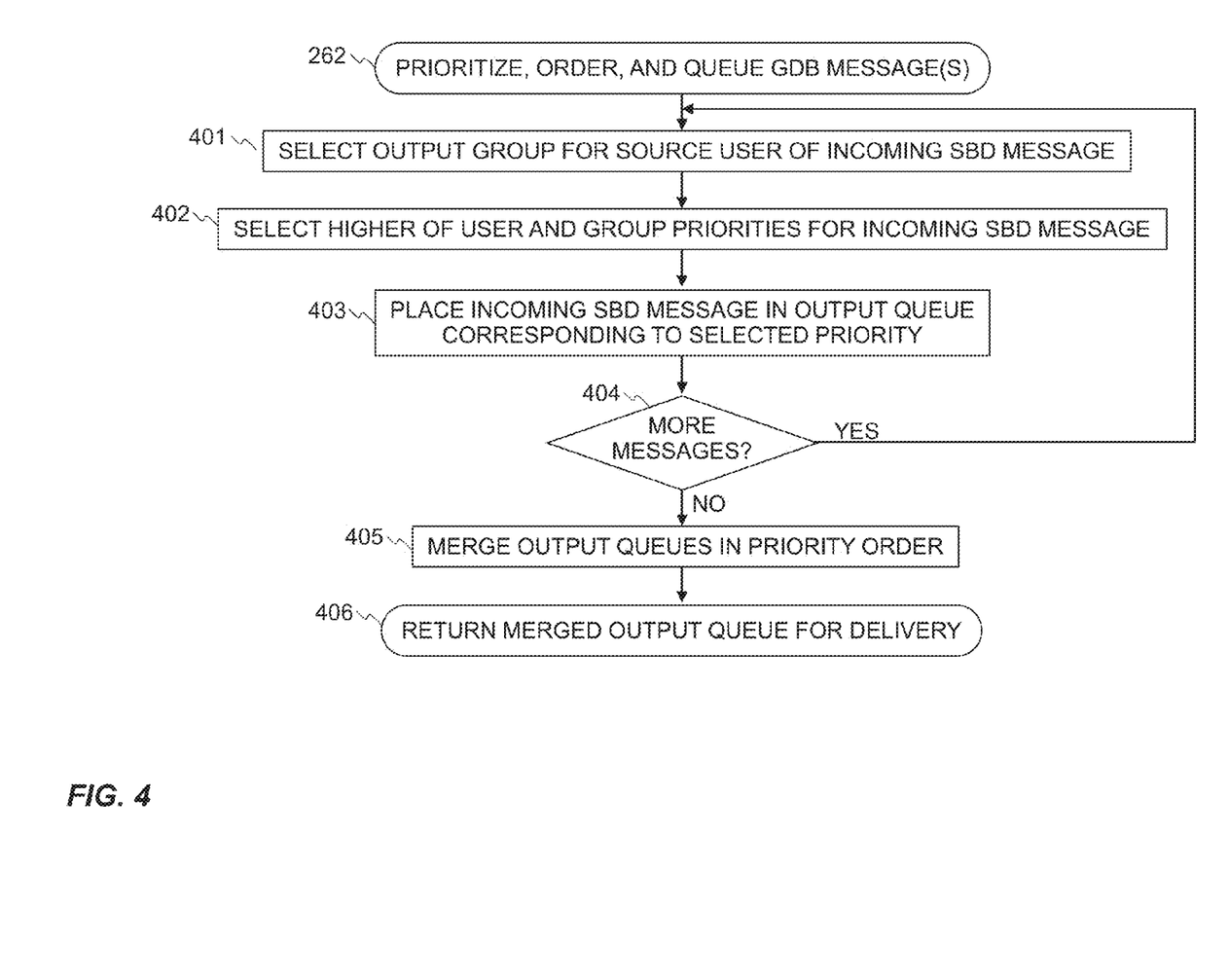
FIG. 4 illustrates the process of ordering multiple utterances received at a PTT Server prior to their transmission to an unlimited number of listeners, in accordance with the present invention, in accordance with the principles of the present invention.

FIG. 4 details Subroutine 262, Prioritize, Order, and Queue GDB Message(s). This method is a part of Server Process 260 in Method 200, Transmit Utterances from Talker to Multiple Listeners, and is implemented in PTT Server 160, specifically Prioritization Engine 364. The method begins at Step 401, in which an incoming SBD Message containing recognized speech encoded as compressed text is selected, its sending user is identified, and the destination group is determined. These determinations are made using identifying data in the message coupled with information in User Database 331. In Step 402, the message is prioritized by finding the higher of the sending user's priority and the receiving group's priority. These may be the same or different, depending on the user's role both within the group and as a member of other groups with other roles. In a preferred embodiment, these priorities are loaded into User Database 331 and Group Database 332 using Provisioning Agent 323.

At Step 402, the message is then placed in an output queue corresponding to the priority selected at Step 401. If there are other messages in the queue at the same priority, this message will go behind them. If there are more message that have been received in this cycle, determined at Step 404, the method returns to the top and repeats Steps 401, 402, and 403 for each one. Once Step 404 determines that there are no more incoming messages available in this cycle, the method proceeds to Step 405, at which point the multiple priority queues are merged into a single list. This merge places the highest priority messages at the front, followed by the contents of each priority queue in order or precedence. This allows more important messages to go out before less important messages, thereby implementing preemption as well. Finally, at Step 406 the merged list is returned to Process 260 for use as an output queue by Step 263 in FIG. 2.

Figure 5:
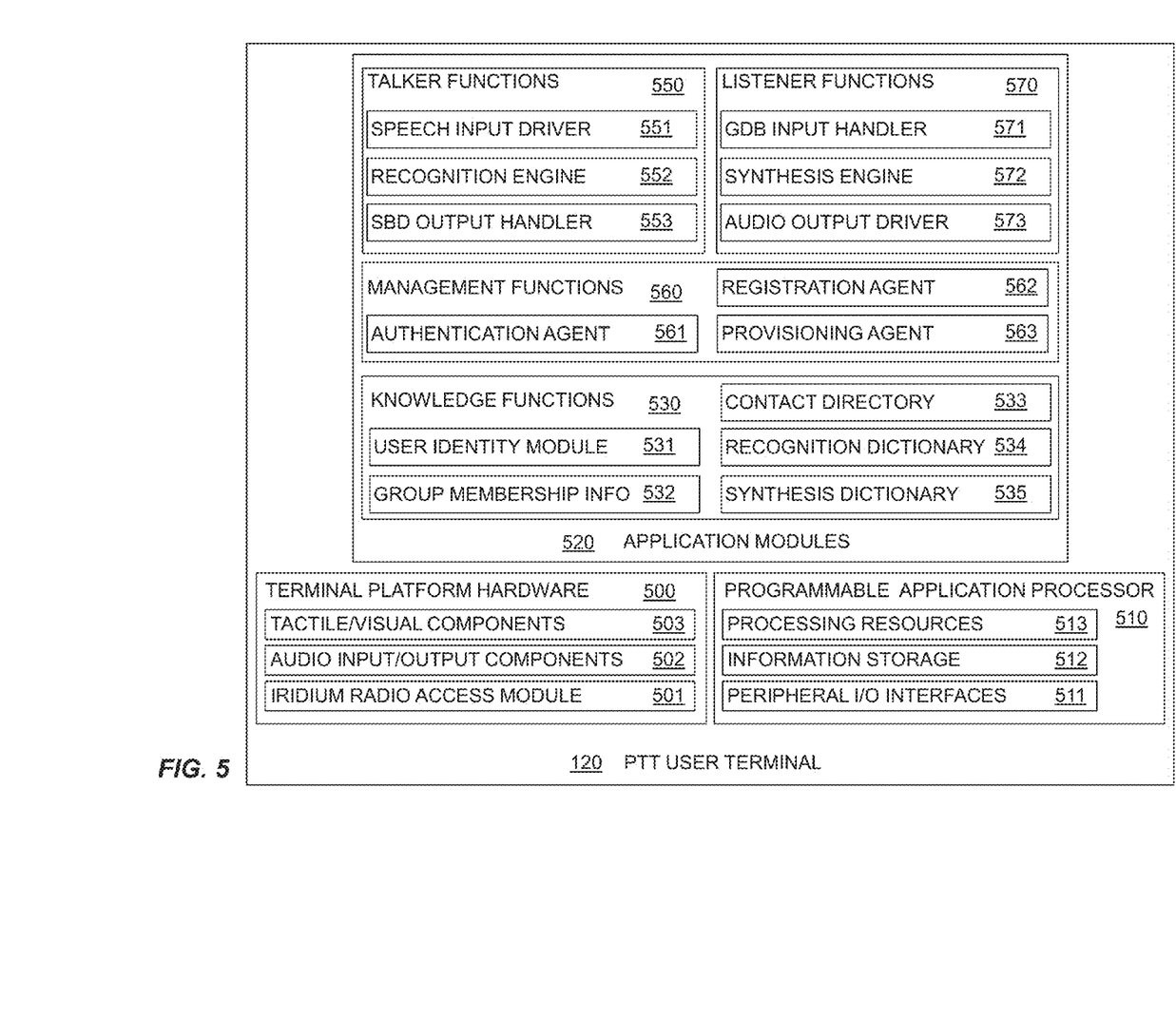
FIG. 5 illustrates a block diagram of a user terminal device capable of transmitting, and receiving utterances, in accordance with the principles of the present invention.

FIG. 5 details the architecture of a PTT User Terminal 120. In a preferred embodiment, this will typically be a handset or similar device, but other form factors may also be implemented; this description is generic to any form factor. PTT User Terminal 120 consists primarily of two major hardware subsystems, Terminal Platform Hardware 500 and Programmable Application Processor 510, and a group of Application Modules 520 that are implemented as software components executing in Programmable Application Processor 510.

Terminal Platform Hardware 500 comprises typical componentry found in handset devices used for other purposes, and will in a preferred embodiment be all or nearly all off-the-shelf items. Iridium Radio Access Module 501 provides the hardware and firmware required to access the Iridium satellite network and take advantage of its services. Audio Input/Output Components 502 include the usual microphone and speaker, as well as digital conversion and driver functions necessary to take in speech uttered by the user and play out speech received over the network. Tactile/Visual Components 503 include the usual keypad and screen, as well as other buttons and indicators, that are used to provide a typical user interface experience. Programmable Application Processor 510 also comprises typical componentry found in modern handset devices used for other purposes, and will in a preferred embodiment be all or nearly all off-the-shelf items. It may also be embedded in common chipsets with much of the Terminal Platform Hardware 500. Peripheral I/O Interfaces 511, Information Storage 512, and Processing Resources 513 provide capabilities that are obvious by their names.

Application Module 520 consists of software components that execute in Programmable Application Processor 510 and embody the end-user aspects of the present invention. It should be noted that these components are built on top of the usual operating system and hardware drivers, which are not shown but which can be inferred by those skilled in the art. Components are grouped into function sets for convenience of representation and description, but these groupings do not necessarily constrain implementation.

Knowledge Functions 530 contain representations of and operations on data that is relevant to the PTT capability. User Identity Module 531 embodies identifiers, authentication keys, and other information that ensures a particular device can access services in the network. It is similar to, and in a preferred embodiment may be implemented as, a standard Subscriber Identity Module (SIM) that is well known to those skilled in the art. Group Membership Info 532 embodies the specific PTT groups of which the user is a member, including the identity of the group for the purpose of receiving GDB messages. It may also include a list of indices referring to other users that are members of the group, and that appear in Contact Directory 533 which records those other users that are known to this one. Recognition Dictionary 534 contains information that aids the speech recognition algorithms of Step 252, and may be either general or mission-specific in nature according to the needs of a particular deployment. Similarly, Synthesis Dictionary 535 contains information that aids the speech synthesis algorithms of Step 273, and may also be either general or mission-specific according to deployment needs.

Management Functions 560 perform housekeeping operations relevant to the overall PTT capability. Authentication Agent 561 embodies the protocol interactions necessary to ensure that the network is authentic, and to assure the network that the user is authentic and authorized. It uses information in User Identity Module 531 for this purpose. Specific methods are not pertinent to the present invention, and may consist of either standard or purpose-built protocols, although a preferred embodiment will use commonly available and well known standards. Similarly, Registration Agent 562 uses Group Membership Info 532 to establish presence on the network and within one or more groups as appropriate for a particular deployment. Here again, a preferred embodiment will use standard methods and protocols for these functions, although in the present invention the corresponding signaling will be carried in Iridium SBD messages, rather than other transport services that may be more commonly used. Provisioning Agent 563 provides capabilities for making and managing entries in the various modules under Knowledge Functions 530. Both local and over the air mechanisms are available in a preferred embodiment, and in particular in the present invention, secure messaging via Iridium GDB will be available for updating common data in multiple PTT User Terminals 120.

The heart of the present invention is found in Talker Functions 550 and Listener Functions 570, which embody Talker Process 225 and Listener Process 227, respectively, from FIG. 2. On the talker side, Speech Input Driver 551 takes care of interacting with the input hardware of Audio Input/Output Components 502 to execute the capture of utterances that occurs in Step 251. Recognition Engine 552 embodies the speech recognition algorithms and coding that occurs in Steps 251 and 252; as previously noted, this is implemented in a preferred embodiment using an off-the-shelf technology, although for particular deployments one or more special-purpose technologies may be incorporated without loss of generality. SBD Output Handler 553 then handles the packaging and transmission of coded messages via the Iridium SBD service, using the capabilities of the Iridium Radio Access Module 501.

On the listener side, GDB Input Handler 571 uses the capabilities of Iridium Radio Access Module 501 to receive pertinent GDB broadcast messages according to the groups identified in Group Membership Info component 532. Synthesis Engine 572 in turn handles the decoding of text and embodies the speech synthesis algorithms according to Steps 272 and 273 of Method 200. Here again, Synthesis Engine 572 will in a preferred embodiment consist of off-the-shelf technologies, but for particular deployments one or more special-purpose technologies may be incorporated without loss of generality. Audio Output Drive 573 then handles the interaction with the output hardware of Audio Input/Output Components 502 to play out the synthesized speech according to Step 273 of FIG. 2.

The invention has been described above with reference to preferred embodiments and specific applications. It is not intended that the invention be limited to the specific embodiments and applications shown and described, but that the invention be limited in scope only by the claims appended hereto. It will be evident to those skilled in the art that various substitutions, modifications, and extensions may be made to the embodiments as well as to various technologies which are utilized in the embodiments. It will also be appreciated by those skilled in the art that such substitutions, modifications, and extensions fall within the spirit and scope of the invention, and it is intended that the invention as set forth in the claims appended hereto includes all such substitutions, modifications, and extensions.

What is claimed is:

1. A method of providing a communication to a receiving device, comprising:
converting a first push-to-talk audio utterance captured with a push-to-talk communication device into a text based message; and
transmitting, via a text delivery optimized communication network, said text based message to a server, said server returning a list of Global Data Broadcast (GDB) messages and corresponding destination parameters, determining a priority of said GDB messages based on said destination parameters, and transmitting
said text based message, via an Iridium GDB communication network, to at least one receiving device based on a destination parameter associated with said text based message and a priority of said text based message, said at least one receiving device converting said text based message into a second push-to-talk audio utterance.

2. The method of providing a communication to a receiving device according to claim 1, wherein:
said transmitting is performed by said push-to-talk communication device.

3. The method of providing a communication to a receiving device according to claim 1, wherein:
said text delivery optimized communication network is an Iridium Short Burst Data (SBD) communication network.

4. The method of providing a communication to a receiving device according to claim 1, wherein:
said text delivery optimized communication network carries a maximum 340 bytes of information for a single communication.

5. The method of providing a communication to a receiving device according to claim 1, wherein:
said text based message is queued for delivery using an Iridium Short Burst Data (SBD) communication network's native access protocol.

6. The method of providing a communication to a receiving device according to claim 1, wherein:
said at least one receiving device is a listen-only device.

7. The method of providing a communication to a receiving device according to claim 1, further comprising:
compressing said text based message.

8. The method of providing a communication to a receiving device according to claim 1, wherein:
said text based message is prioritized prior to said transmission to said at least one receiving device.

9. The method of providing a communication to a receiving device according to claim 8, wherein:
said prioritized text based message is prioritized based on an identification of a source device.

10. The method of providing a communication to a receiving device according to claim 8, wherein:
said prioritized text based message is prioritized based on an identification of said at least one receiving device.

11. A push-to-talk communication device to communicate with a receiving device, comprising:
a speech-to-text converter to convert a first push-to-talk audio utterance captured with said push-to-talk communication device into a text based message; and
a transmitter to transmit, via a text delivery optimized communication network, said text based message to a server, said server returning a list of Global Data Broadcast (GDB) messages and corresponding destination parameters, determining a priority of said GDB messages based on said destination parameters, and transmitting
said text based message, via an Iridium GDB communication network, to at least one receiving device based on a destination parameter associated with said text based message and a priority of said text based message, said at least one receiving device converting said text based message into a second push-to-talk audio utterance.

12. The push-to-talk communication device to communicate with a receiving device according to claim 11, wherein:
said text delivery optimized communication network is an Iridium Short Burst Data (SBD) communication network.

13. The push-to-talk communication device to communicate with a receiving device according to claim 11, wherein:
said text delivery optimized communication network carries a maximum 340 bytes of information for a single communication.

14. The push-to-talk communication device to communicate with a receiving device according to claim 11, wherein:
said text based message is queued for delivery using an Iridium Short Burst Data (SBD) communication network's native access protocol.

15. The push-to-talk communication device to communicate with a receiving device according to claim 11, wherein:
said at least one receiving device is a listen-only device.

16. The push-to-talk communication device to communicate with a receiving device according to claim 11, wherein:
said text based message is a compressed text based message.

17. The push-to-talk communication device to communicate with a receiving device according to claim 11, wherein:
said text based message is prioritized prior to said transmission to said at least one receiving device.

18. The push-to-talk communication device to communicate with a receiving device according to claim 17, wherein:
said prioritized text based message is prioritized based on an identification of a source device.

19. The push-to-talk communication device to communicate with a receiving device according to claim 17, wherein:
said prioritized text based message is prioritized based on an identification of said at least one receiving device.

20. A method of providing a communication to a receiving device, comprising:
receiving, via a satellite broadcast optimized communication network, a text based message, converted from a first push-to-talk audio utterance captured with a push-to-talk communication device, from a server, said server returning a list of Global Data Broadcast (GDB) messages and corresponding destination parameters, determining a priority of said GDB messages based on said destination parameters, and transmitting said text based message, via an Iridium GDB communication network, to at least one receiving device based on a destination parameter associated with said text based message and a priority of said text based message; and
converting said text based message into a second push-to-talk audio utterance.

21. The method of providing a communication to a receiving device according to claim 20, wherein:
said receiving device receiving said text based message is a second push-to-talk communication device.

22. The method of providing a communication to a receiving device according to claim 20, wherein:
said text delivery optimized communication network is an Iridium Short Burst Data (SBD) communication network.

23. The method of providing a communication to a receiving device according to claim 20, wherein:
said text delivery optimized communication network carries a maximum 340 bytes of information for a single communication.

24. The method of providing a communication to a receiving device according to claim 20, wherein:
said text based message is queued for delivery using an Iridium Short Burst Data (SBD) communication network's native access protocol.

25. The method of providing a communication to a receiving device according to claim 20, wherein:
said receiving device is a listen-only device.

26. The method of providing a communication to a receiving device according to claim 20, wherein:
said text based message is a compressed text message.

27. The method of providing a communication to a receiving device according to claim 20, wherein:
said text based message is prioritized prior to said transmission to said receiving device.

28. The method of providing a communication to a receiving device according to claim 27, wherein:
said prioritized text based message is prioritized based on an identification of a source device.

29. The method of providing a communication to a receiving device according to claim 27, wherein:
said prioritized text based message is prioritized based on an identification of said at least one receiving device.

30. A communication device to communicate with a receiving device, comprising:
a receiver to receive, via an Iridium Global Data Broadcast (GDB) communication network, a text based message, converted from a first push-to-talk audio utterance captured with a push-to-talk communication device, from a server, said server returning a list of Global Data Broadcast (GDB) messages and corresponding destination parameters, determining a priority of said GDB messages based on said destination parameters, and transmitting said text based message, via an Iridium GDB communication network, to at least one receiving device based on a destination parameter associated with said text based message and a priority of said text based message; and
a text-to-speech converter, at said receiving device, to convert said text based message into a second push-to-talk audio utterance.

31. The communication device to communicate with a receiving device according to claim 30, wherein:
said receiving device receiving said text based message is a second push-to-talk communication device.

32. The communication device to communicate with a receiving device according to claim 30, wherein:
said text delivery optimized communication network is an Iridium Short Burst Data (SBD) communication network.

33. The communication device to communicate with a receiving device according to claim 30, wherein:
said text delivery optimized communication network carries a maximum 340 bytes of information for a single communication.

34. The communication device to communicate with a receiving device according to claim 30, wherein:
said text based message is queued for delivery using an Iridium Short Burst Data (SBD) communication network's native access protocol.

35. The communication device to communicate with a receiving device according to claim 30, wherein:
said at least one receiving device is a listen-only device.

36. The communication device to communicate with a receiving device according to claim 30, wherein:
said text based message is a compressed text based message.

37. The communication device to communicate with a receiving device according to claim 30, wherein:
  said text based message is prioritized prior to said transmission to said at least one receiving device.

38. The communication device to communicate with a receiving device according to claim 37, wherein:
  said prioritized text based message is prioritized based on an identification of a source device.

39. The communication device to communicate with a receiving device according to claim 37, wherein:
  said prioritized text based message is prioritized based on an identification of said at least one receiving device.

40. A communication server, comprising:
  an input handler to receive, via a text delivery optimized communication network, a text based message converted from a first push-to-talk audio utterance captured with a push-to-talk communication device;
  a subroutine, at said communication server, to return a list of Global Data Broadcast (GDB) messages and corresponding destination parameters, and determine a priority of said GDB messages based on said destination parameters; and
  an output handler at said communication server to transmit, via an Iridium GDB communication network, said text based message to at least one receiving device based on a destination parameter associated with said text based message and a priority of said text based message,
  said at least one receiving device converting said text based message into a second push-to-talk audio utterance.

41. The communication server according to claim 40, wherein:
  a transmitting device transmitting said text based message is said push-to-talk communication device.

42. The communication server according to claim 40, wherein:
  said at least one receiving device is a push-to-talk communication device.

43. The communication server according to claim 40, further comprising:
  a prioritizer to prioritize transmission of said text based message.

44. The communication server according to claim 43, wherein:
  said prioritizer prioritizes transmission of said text based message based on a higher of a sending device's priority and a receiving device's priority.

45. The communication server according to claim 40, wherein:
  said text delivery optimized communication network is an Iridium Short Burst Data (SBD) communication network.

* * * * *

UNITED STATES PATENT AND TRADEMARK OFFICE
CERTIFICATE OF CORRECTION

PATENT NO. : 9,693,206 B2  
APPLICATION NO. : 13/901893  
DATED : June 27, 2017  
INVENTOR(S) : Bishop, Jr. et al.

Page 1 of 1

It is certified that error appears in the above-identified patent and that said Letters Patent is hereby corrected as shown below:

On the Title Page

Please add the following section:
--(60) Related U.S. Application Data
Provisional application No. 61/760,325 filed February 4, 2013.--

Signed and Sealed this
First Day of May, 2018

Andrei Iancu
*Director of the United States Patent and Trademark Office*